United States Patent
Cho et al.

(10) Patent No.: US 10,658,670 B2
(45) Date of Patent: May 19, 2020

(54) ANODE INCLUDING FUNCTIONALIZED METAL OXIDE NANOPARTICLES, A METHOD FOR MANUFACTURING THE ANODE, A SECONDARY BATTERY INCLUDING THE ANODE, AND A DEVICE INCLUDING THE SECONDARY BATTERY

(71) Applicant: KOREA INSTITUTE OF SCIENCE AND TECHNOLOGY, Seoul (KR)

(72) Inventors: Won Il Cho, Seoul (KR); In Wook Nah, Seoul (KR); In Hwan Oh, Seoul (KR); Van Dung Do, Seoul (KR); Mun Sek Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 163 days.

(21) Appl. No.: 15/846,855

(22) Filed: Dec. 19, 2017

(65) Prior Publication Data
US 2018/0241042 A1 Aug. 23, 2018

(30) Foreign Application Priority Data
Feb. 22, 2017 (KR) ........................ 10-2017-0023474

(51) Int. Cl.
*H01M 4/62* (2006.01)
*H01M 4/134* (2010.01)
(Continued)

(52) U.S. Cl.
CPC .............. *H01M 4/628* (2013.01); *C09D 4/00* (2013.01); *H01M 4/0402* (2013.01);
(Continued)

(58) Field of Classification Search
CPC .............................. H01M 4/134; H01M 4/628
(Continued)

(56) References Cited

U.S. PATENT DOCUMENTS

| 2016/0108143 A1* | 4/2016 | Baran, Jr. ................. C08F 2/44 525/251 |
| 2016/0126581 A1* | 5/2016 | Timofeeva ............ H01M 8/188 429/81 |
| 2016/0190646 A1* | 6/2016 | Kim .................. H01M 10/0567 429/332 |

FOREIGN PATENT DOCUMENTS

| KR | 10-2014-0022735 A | 2/2014 |
| KR | 10-2016-0051574 A | 5/2016 |
| KR | 10-2016-0092241 A | 8/2016 |

OTHER PUBLICATIONS

Schaefer et al. High Lithium transference Number Electrolytes via Creation of 3-Dimensional, Charged, Nanoporous Networks from Dense Functionalized Nanoparticle Composites. Chem. Mater. vol. 25, 2013, pp. 834-839. Retrieved from URL: <https://pubs.acs.org/doi/pdf/10.1021/cm303091j?rand=rv9ogg2y> (Year: 2013).*

(Continued)

*Primary Examiner* — James M Erwin
(74) *Attorney, Agent, or Firm* — Rabin & Berdo, P.C.

(57) ABSTRACT

An anode includes a thin film of an anode material; and a protective layer that is formed on the thin film of the anode material, that is composed of functionalized metal oxide nanoparticles, which are lithium-terminated sulfonated metal oxide nanoparticles, and that has a thickness of 300-5000 nm. A method for manufacturing the anode includes dispersing the functionalized metal oxide nanoparticles into a dispersion medium to form a dispersion; dipping a substrate into water, and introducing the dispersion thereto so that the functionalized metal oxide nanoparticles form a self-assembled molecular film on the water surface; lifting the substrate over the water surface to transfer the self-assembled molecular film onto the substrate, thereby providing a substrate coated with a functionalized metal oxide film; and transferring the functionalized metal oxide film (Continued)

onto the thin film of the anode material to provide an anode coated with the functionalized metal oxide film.

20 Claims, 10 Drawing Sheets

(51) Int. Cl.
    *H01M 4/38*     (2006.01)
    *H01M 4/1395*     (2010.01)
    *H01M 4/04*     (2006.01)
    *H01M 10/0569*     (2010.01)
    *H01M 10/0568*     (2010.01)
    *H01M 4/36*     (2006.01)
    *C09D 4/00*     (2006.01)
    *H01M 10/052*     (2010.01)
    *H01M 10/054*     (2010.01)
    *H01M 12/08*     (2006.01)
    *H01M 10/42*     (2006.01)
    *H01M 4/02*     (2006.01)

(52) U.S. Cl.
    CPC .......... *H01M 4/134* (2013.01); *H01M 4/1395* (2013.01); *H01M 4/366* (2013.01); *H01M 4/38* (2013.01); *H01M 4/382* (2013.01); *H01M 10/052* (2013.01); *H01M 10/054* (2013.01); *H01M 10/0568* (2013.01); *H01M 10/0569* (2013.01); *H01M 10/4235* (2013.01); *H01M 12/08* (2013.01); *H01M 2004/027* (2013.01); *H01M 2300/0037* (2013.01); *Y02E 60/128* (2013.01)

(58) Field of Classification Search
    USPC .................................................... 429/231.95
    See application file for complete search history.

(56) References Cited

OTHER PUBLICATIONS

Nugent et al. Nanoscale Organic Hybrid Electrolytes. Adv. Mater. vol. 22, 2010, pp. 3677-3680. Retrieved from URL: <https://onlinelibrary.wiley.com/doi/pdf/10.1002/adma.201000898> (Year: 2010).*

Yu Ho Wen et al., "Structure, Ion Transport, and Rheology of Nanoparticle Salts", Macromolecules, 2014, pp. 4479-4492, vol. 47.

* cited by examiner

ANODE INCLUDING FUNCTIONALIZED METAL OXIDE NANOPARTICLES, A METHOD FOR MANUFACTURING THE ANODE, A SECONDARY BATTERY INCLUDING THE ANODE, AND A DEVICE INCLUDING THE SECONDARY BATTERY

CROSS-REFERENCE TO RELATED APPLICATIONS

This application claims priority under 35 U.S.C. § 119 to Korean Patent Application No. 10-2017-0023474 filed on Feb. 22, 2017 in the Korean Intellectual Property Office, the disclosure of which is incorporated herein by reference in its entirety.

TECHNICAL FIELD

The following disclosure relates to functionalized metal oxide nanoparticles and lithium metal anode for a secondary battery, such as a lithium-sulfur battery, including the same. Particularly, the following disclosure relates to lithium-terminated sulfonated metal oxide nanoparticles, lithium metal anode including the same as a protective layer, and a secondary battery, such as a lithium-sulfur battery, including the anode.

BACKGROUND

The concept of a lithium ion battery (LiB) was set in 1962. Right after that, a lithium ion battery (LiB) was suggested by M. S. Whittingham of Exxon Company, leading to the invention of Li—$TiS_2$ batteries. However, commercialization of a battery system using lithium metal and Li—$TiS_2$ as an anode and cathode, respectively, was failed. This is because the anode of lithium metal (LiM) has poor safety and air/water sensitive Li—$TiS_2$ requires high production cost.

Then, the aforementioned problems were solved by utilizing ion intercalation/deintercalation based materials such as graphite and cathodic oxides (developed by J. O. Bosenhard) for the electrodes. In 1991, the first commercialized product of LiB was launched by Sony and Asahi Chemicals and brought a progressive chance for leading successful spread of the market of portable electronics. LiB has satisfied a need for electric energy directly related with continuous innovation of general electric devices, such as cellular phones, music players, speakers, drones, vehicles and microsensors. Many researchers and scientists have studied and investigated novel and advanced energy materials, chemistry and physics about the fixed/mobile energy storage systems satisfying an increasing need for energy.

As the development of commercialized LiB technology reaches a saturation point, research and development of a novel energy material having a different shape and composition is required essentially in order to meet the energy requirements. Therefore, secondary batteries having high energy density, such as lithium-sulfur batteries and lithium-air batteries, employing conversion based mechanism, have been given many attentions as next-generation of Li ion batteries.

The sulfur theoretically has an energy density of about 2,600 Wh/kg. Thus, it shows an energy density approximately 7 times higher than that of conventional (about 360 Wh/kg, $C/Co_2O_4$) of LiBs. One of the anode materials, LiM, has a high theoretical energy density of about 3,560 Wh/kg as well as a significantly low redox potential (−3.04V Vs. S.H.E.) and a density of 0.59 g/$cm^3$. On the contrary, a graphite anode material has a theoretical energy density of about 372 mAh/g and a slightly high redox potential and density. Therefore, when a graphite anode is substituted with a lithium metal anode, the gravimetric energy density of the battery system improves significantly. When lithium-sulfur and lithium-air batteries are commercialized in the future, it is expected that such a LiM anode and conversion based cathode suggest a hopeful way in overcoming a need for high energy density.

Although such a lithium-sulfur battery using LiM as an anode has some advantages, there are problems in commercialization thereof. First, sulfur has a low electric/ionic-conductivity ($5 \times 10^{-30}$ $Scm^{-1}$, room temperature) and the product thereof, $Li_2S$, also is an insulator. In addition, sulfur has a volume increased by about 80% upon a completely discharged state. The final reaction product, $Li_2S$, forms intermediate species called lithium polysulfides (LiPS, $Li_2Sn$, 2<n<8). LiPS are dissolved into an organic electrolyte to cause the problems of loss of an active material and degradation of the electrodes. When LiPS is present in the electrolyte, it moves through the pores of a separator via concentration gradient and arrives at a lithium anode, thereby forming an internal shuttling pathways between the lithium anode and a sulfur cathode. Such a phenomenon is well known as LiPS shuttling. During shuttling, dissolved LiPS, particular LiPS having a high n value, is reduced on the lithium surface and thus passivates the anode surface, resulting in a rapid decrease in capacity, Coulombic efficiency, and the cycle life of the Li—S battery. Although, it is known that $LiNO_3$ additive is effective for increasing LiM. However, it does not provide a perfect solution to protect highly reactive and electrochemically unstable lithium metal anode.

Another attempt is made by ensuring reversibility of electrodeposition of lithium during charging/discharging. Highly reactive and non-uniform electrodeposition of lithium cause problems, such as internal short circuit, decomposition of electrolyte and loss of lithium. Non-uniform electrodeposition of lithium ions that occurs during charging causes formation of Li dendrites that pierce through a separator. Such a short-circuit causes a thermal runaway, leading to a severe safety issue of catching a fire by ignition of the electrolyte. Another problem of LiM batteries includes side reactions of electrolyte and instability of Coulomb efficiency, which makes the battery system inefficient. Such instability occurs due to a continuous reaction among Li, active species, and electrolyte. Thus, solid-electrolyte interphase (SEI) is continuously regenerated, and the electrodes are passivated during repeated charge/discharge cycles. Such an undesired side reactions pile up inactive species at the electrode/electrolyte interfaces in the battery system, resulting in deterioration of the performance of the battery. Therefore, it is necessary to form stable SEIs and to electrochemically and physically protect the lithium surface.

Although the initial researchers have tried to improve the performance of the battery via several means, such as mechanical ball milling of sulfur and carbon or surface coating using carbon, there was no significant effect. To solve the problem of limitation in electrochemical reaction caused by electroconductivity, it is required to reduce the particle size to a size of several tens of nanometers or less or to carry out surface treatment with a conductive materials. For this purpose, there have been suggested several physical methods (melt impregnation into nano-sized porous carbon nanostructure or metal oxide structure), mechanical method (high-energy ball milling), or the like.

In addition, there is a method of forming a coating layer on the surface of cathode particles to prevent dissolution of LiPS or adding a porous material capable of capturing dissolved LiPS. Typically, there have been suggested a method of coating the surface of a cathode structure containing sulfur particles with a conductive polymer, a method of coating the surface of a cathode structure with a lithium ion conductive metal oxide, a method of adding a porous metal oxide having a large specific surface area and large pores and capable of absorbing a large amount of LiPS to a cathode, a method of attaching a functional group capable of adsorbing LiPS to the surface of a carbon structure, or a method of surrounding sulfur particles by using graphene oxide or the like.

Active studies have been conducted about controlling the shuttling by improving the characteristics of the SEI formed on the surface of the anode. First, Cui and coworkers at Stanford University have suggested that an interconnected hollow carbon sphere film (thickness: 200-300 nm) is formed artificially on the surface of lithium metal so that LiM may be isolated from electrolyte. The artificial SEI layer called "Hard-Film" and electrochemically and mechanically stable can inhibit lithium dendrites. In addition, Archer and coworkers at Cornell University have suggested that LiF-coated Li reduces growth of lithium dendrites and forms a stable SEI to provide a lithium anode free from dendrites. Although other effective chemical additives and artificial SEI films have been suggested, it is required to develop an economical, simple and effective process for preparing the protective layer in order to allow commercialization of LiM anode.

Protection of a LiM anode is more important when a conversion based cathode materials are used. Archer and Nazar suggested a Li—S battery having significantly improved reversibility by using carbon nanospheres and regular nanostructured carbon (e.g. CMK series) in 2011 and 2009, respectively. Then, many attentions have been given to a LiM anode and sulfur cathode again. In a Li—S battery, redox reaction (16Li+S$_8$ ↔8Li$_2$S) between lithium and sulfur occurs spontaneously and reversibly. Use of sulfur having a large deposit and low cost has reinforced a base for manufacturing a Li—S battery. However, commercialization of Li—S batteries has been delayed due to multiple fundamental thermodynamic problems.

Therefore, it is imminently required to develop an electrochemically stable lithium metal anode using the conversion based cathode (particularly, sulfur) as well as an implantable cathode in order to obtain the next generation battery that surpasses current LiB technologies.

REFERENCES

Patent Document

Korean Patent Publication No. 10-2016-0092241
Korean Patent Publication No. 10-2014-0022735

SUMMARY

An embodiment of the present disclosure is directed to provide lithium-terminated sulfonated metal oxide nanoparticles, which have a functionalized nanoparticle layer introduced, thereto so that negatively charged sulfonate groups may induce electrostatic repulsion of lithium polysulfides and limit access of lithium polysulfides to a lithium metal anode while reducing the interfacial impedence by lithium fixed to sulfonate groups, inhibiting formation/proliferation of Li dendrites on the anode to increase Coulombic efficacy of the battery, and improve the electrochemical characteristics, such as charge/discharge capacity retention rate, cycle life and rate rate performance, and an anode including the same.

Another embodiment of the present disclosure is directed to introducing the above-mentioned anode to a secondary battery, particularly a lithium-sulfur battery, and applying the same to energy storage devices included in various electronic/electric appliances to ensure global competitiveness of electrochemical capacitor industry.

In one aspect, there are provided functionalized metal oxide nanoparticles which are lithium-terminated sulfonated metal oxide nanoparticles.

According to an embodiment, the functionalized metal oxide may be represented by the following Chemical Formula 1:

[Chemical Formula 1]

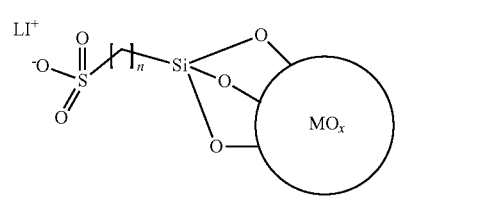

wherein MO$_x$ is a metal oxide, and n is a repetition number and is any one integer selected from 1-10.

According to another embodiment, the metal oxide may include at least one selected from titania, alumina, silica, zirconia, seria, yttria and manganese oxide.

According to still another embodiment, the metal oxide may be represented by the following Chemical Formula 2:

[Chemical Formula 2]

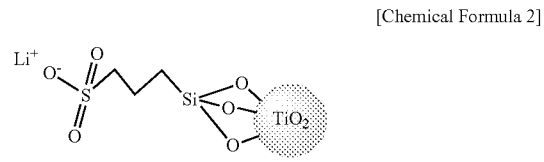

In another aspect, there is provided a method for preparing functionalized metal oxide nanoparticles, including the steps of:

(a) dispersing metal oxide nanoparticles into a solvent to provide a dispersion;

(b) mixing the dispersion with a sulfonating agent and carrying out reaction to obtain a mixture containing sulfonated metal oxide nanoparticles; and (c) adding lithium hydroxide to the mixture to form lithium terminal groups, thereby providing functionalized metal oxide nanoparticles represented by the following Chemical Formula 1:

[Chemical Formula 1]

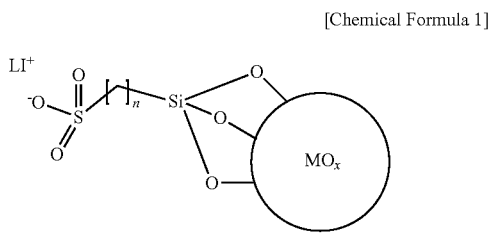

wherein $MO_x$ is a metal oxide, and
n is a repetition number and is any one integer selected from 1-10.

According to an embodiment, the sulfonating agent may be 3-trihydroxysilyl-1-propanesulfonic acid.

According to another embodiment, the metal oxide nanoparticles may have a particle size of 30-50 nm.

According to still another embodiment, the dispersion in step (a) may be carried out by ultrasonic dispersion.

According to still another embodiment, step (b) may be carried out so that a pH of 1.5-2.5 may be obtained by the mixing with the sulfonating agent.

According to still another embodiment, the reaction of step (b) may be carried out at 10-70° C.

According to still another embodiment, the reaction of step (b) may be carried out for 5-30 hours.

According to still another embodiment, lithium hydroxide may be added to pH 7, in step (c).

According to still another embodiment, the method may further include step (d) of removing the remaining sulfonating agent by centrifugal separation, after step (c).

According to still another embodiment, the method may further include step (e) of washing and drying the functionalized metal oxide nanoparticles, after step (d).

In still another aspect, there is provided an anode including: a thin film of an anode material; and a protective layer formed on the thin film of an anode material and including the functionalized metal oxide nanoparticles.

According to an embodiment, the thin film of the anode material may include any one metal selected from lithium, magnesium, sodium, potassium and aluminum.

According to another embodiment, the protective layer may have a thickness of 300-15000 nm.

In still another aspect, there is provided a method for manufacturing an anode, including the steps of:

(1) dispersing the functionalized metal oxide nanoparticles into a dispersion medium to form a dispersion;

(2) dipping a substrate into water, and introducing the dispersion thereto so that the functionalized metal oxide nanoparticles may form a self-assembled molecular film on the water surface;

(3) lifting the substrate over the water surface to transfer the self-assembled molecular film onto the substrate, thereby providing a substrate coated with a functionalized metal oxide film; and (4) transferring the functionalized metal oxide film onto the thin film of the anode material to provide an anode coated with the functionalized metal oxide film.

According to an embodiment, the dispersion in step (1) may be carried out by ultrasonic dispersion.

According to another embodiment, the dispersion may include the functionalized metal oxide nanoparticles in an amount of 1-5 wt %.

According to still another embodiment, the self-assembled molecular film in step (2) may be formed to cover 20-40% of the surface area of the water surface.

According to still another embodiment, the method may further include a step of drying the substrate coated with the functionalized metal oxide film, after step (3).

According to still another embodiment, steps (2) and (3) may be repeated to control the thickness of the self-assembled molecular film.

According to still another embodiment, the transfer in step (4) may be carried out by laminating the substrate coated with the functionalized metal oxide film with the thin film of the anode material and carrying out pressurization through rolling.

In still another aspect, there is provided a secondary battery including the anode.

According to an embodiment, the secondary battery may be any one selected from lithium-sulfur batteries, lithium-air batteries, lithium ion batteries, magnesium ion batteries, sodium ion batteries, potassium ion batteries and aluminum ion batteries.

In yet another aspect, there is provided a device including the secondary battery and selected from portable electronic instruments, mobile units, electric power supplying instruments and energy storage devices.

According to the anode to which lithium-terminated sulfonated metal oxide nanoparticles are introduced as a protective layer, negatively charged sulfonate groups may cause electrostatic repulsion of lithium polysulfides and limit access of lithium polysulfides to a lithium metal anode while reducing the interfacial resistance by lithium fixed to sulfonate groups, inhibit growth of dendrites at a lithium metal anode and perforation of a separator, the protective layer serves as an artificial solid electrolyte interphase (SEI) layer positioned on the surface of lithium metal and reducing the impedance to charge transfer reaction, thereby increasing the Coulomb efficiency of a lithium-sulfur battery. Thus, it is possible to improve the electrochemical characteristics, such as charge/discharge capacity, life and rate characteristics.

Another embodiment of the present disclosure is directed to introducing the above-mentioned anode to a secondary battery, particularly a lithium-sulfur battery, and applying the same to energy storage devices included in various electronic/electric appliances to ensure global competitiveness of electrochemical capacitor industry.

DETAILED DESCRIPTION OF EMBODIMENTS

Hereinafter, various aspects and embodiments of the present disclosure will be explained in more detail.

Exemplary embodiments now will be described more fully hereinafter with reference to the accompanying drawings, in which exemplary embodiments are shown.

The present disclosure may, however, be embodied in many different forms and should not be construed as limited to the exemplary embodiments set forth therein. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Hereinafter, the functionalized metal oxide nanoparticles according to the present disclosure will be explained in detail.

The functionalized metal oxide nanoparticles are lithium-terminated sulfonated metal oxide nanoparticles.

Particularly, the functionalized metal oxide nanoparticles may be represented by the following Chemical Formula 1:

[Chemical Formula 1]

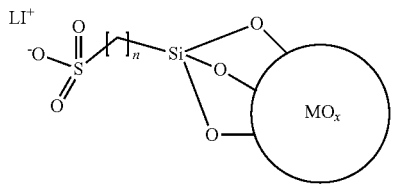

wherein $MO_x$ is a metal oxide, and n is a repetition number and is any one integer selected from 1-10.

Herein, the term 'metal oxide' covers metals and metalloids.

The metal oxide may include at least one selected from titania, alumina, silica, zirconia, seria, yttria and manganese oxide, particularly titania.

The metal oxide may be titania and may be sulfonated by 3-trihydroxysilyl-1-propanesulfonic acid as a sulfonating agent.

Figure 1:
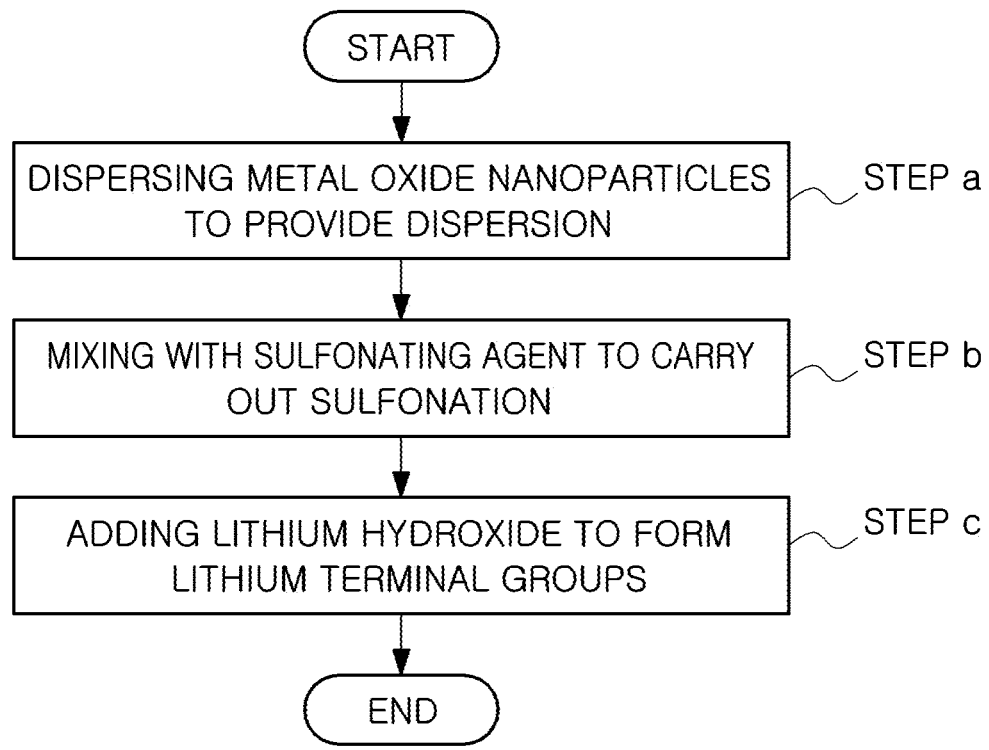
FIG. 1 is a flow chart illustrating the method for preparing the functionalized metal oxide nanoparticles according to an embodiment sequentially.
Figure 2:
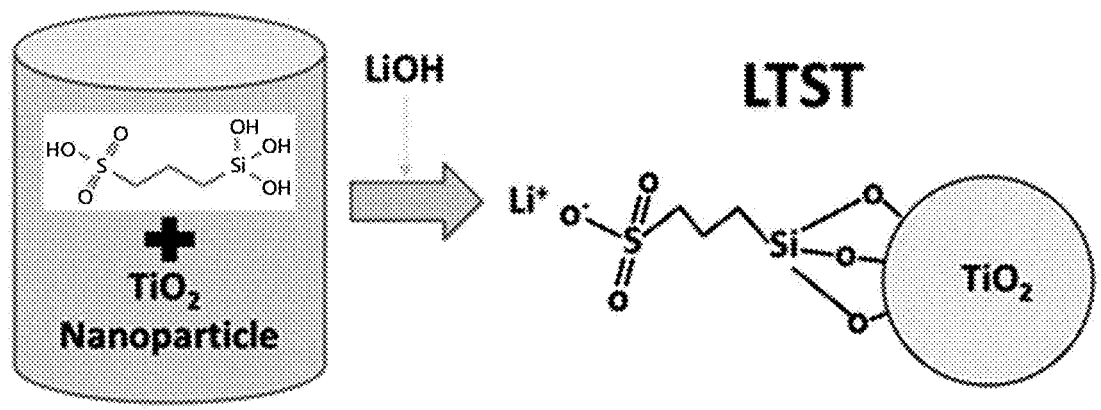
FIG. 2 is a schematic view of the process for preparing the functionalized metal oxide nanoparticles according to an embodiment.

FIG. 1 is a flow chart illustrating the method for preparing the functionalized metal oxide nanoparticles according to an embodiment sequentially, and FIG. 2 is a schematic view of the process for preparing the functionalized metal oxide nanoparticles according to an embodiment. Hereinafter, the method for preparing the functionalized metal oxide according to the present disclosure will be explained with reference to FIG. 1 and FIG. 2.

First, metal oxide nanoparticles are dispersed into a solvent to provide a dispersion (step a).

The metal oxide nanoparticles may include titania, alumina, silica, zirconia, seria, yttria and manganese oxide, particularly titania nanoparticles.

The metal oxide nanoparticles may have a particle diameter of 30-50 nm.

The dispersion may be carried out by ultrasonic dispersion, but is not limited thereto.

Next, the dispersion is mixed with a sulfonating agent and reaction is carried out to provide a mixture containing sulfonated metal oxide nanoparticles (step b).

The sulfonating agent may be 3-trihydroxysilyl-1-propanesulfonic acid.

The sulfonating agent is mixed to a pH of 1.0-2.5, particularly pH 2.0.

The reaction is carried out at 10-70° C., particularly at room temperature.

In addition, the reaction may be carried out for 5-30 hours, particularly for 20-25 hours.

Then, lithium hydroxide is added to the mixture to form lithium terminal groups, thereby providing lithium-terminated sulfonated metal oxide nanoparticles (step c).

Lithium hydroxide may be added to pH 7.

After that, the remaining excessive sulfonating agent is removed by centrifugal separation (step d).

Finally, the functionalized metal oxide nanoparticles are washed and dried to obtain functionalized metal oxide nanoparticles (step e).

Hereinafter, the anode according to the present disclosure will be explained.

The anode includes: a thin film of an anode material; and a protective layer formed on the thin film of an anode material and including functionalized metal oxide nanoparticles which are sulfonated metal oxide nanoparticles.

The thin film of an anode material may include various metals, such as lithium, magnesium, sodium, potassium and aluminum, used as anode materials for a secondary battery. Particularly, the thin film of an anode material may be a lithium thin film.

Particularly, the protective layer may have a thickness of 300-5000 nm.

Figure 3:
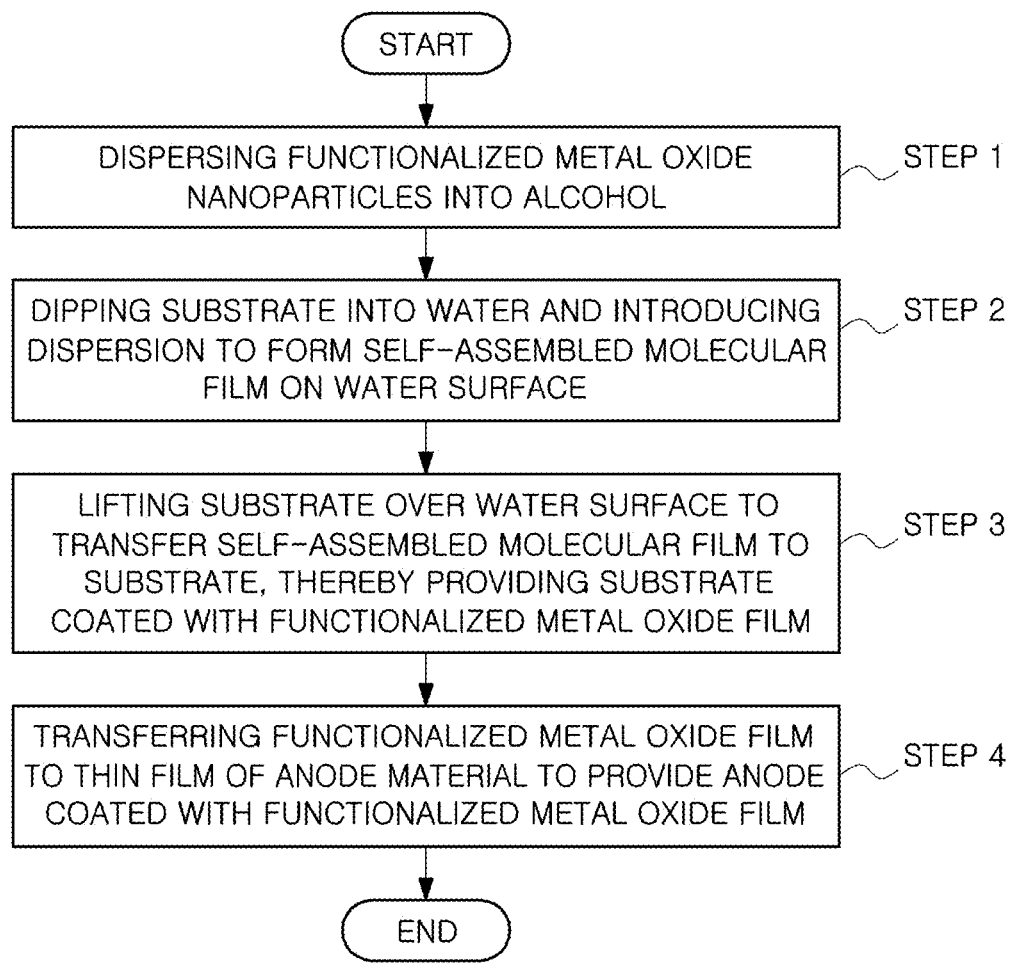
FIG. 3 is a flow chart illustrating the method for manufacturing an anode according to an embodiment sequentially.
Figure 4:
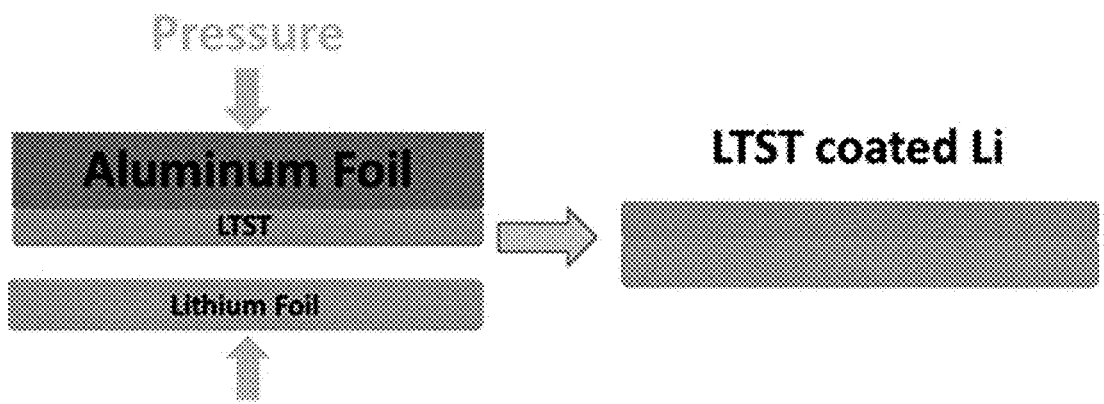
FIG. 4 is a schematic view of the process for manufacturing an anode according to an embodiment.

FIG. 3 is a flow chart illustrating the method for manufacturing an anode according to an embodiment sequentially, and FIG. 4 is a schematic view of the process for manufacturing an anode according to an embodiment. Hereinafter, the method for manufacturing an anode according to the present disclosure will be explained with reference to FIG. 3 and FIG. 4.

Manufacture of an anode according to the present disclosure is characterized in that when forming a protective layer on a thin film of an anode material, one or more Langmuir-Blogett thin film layers are formed. However, this is merely a particular example of methods for forming a coating layer and the present disclosure is not limited thereto.

First, the functionalized metal oxide nanoparticles obtained by the above-described method are dispersed into an alcohol to provide a dispersion (step 1).

The dispersion may be carried out by ultrasonic dispersion but is not limited thereto.

Particularly, the dispersion may include the functionalized metal oxide nanoparticles in an amount of 1-5 wt %, more particularly 2-4 wt %.

Next, a substrate is dipped in water and the dispersion is introduced thereto so that the functionalized metal oxide nanoparticles may form a self-assembled molecular film on the water surface (step 2).

Particularly, the self-assembled molecular film may be formed so that it may cover 20-40% of the surface area of the water surface.

Then, the substrate is lifted over the water surface to transfer the self-assembled molecular film onto the substrate, thereby providing a substrate coated with a functionalized metal oxide film (step 3).

The substrate coated with the functionalized metal oxide film is dried, and step 2 and step 3 may be repeated until the functionalized metal oxide film having a desired thickness is formed.

Finally, the functionalized metal oxide film is transferred to the thin film of an anode material, thereby providing an anode coated with the functionalized metal oxide film (step 4).

The substrate coated with the functionalized metal oxide film is laminated with the thin film of an anode material and pressurization may be carried out through rolling.

In still another aspect, there is provided a secondary battery including the anode.

The secondary battery may be any one selected from lithium-sulfur batteries, lithium-air batteries, lithium ion batteries, magnesium ion batteries, sodium ion batteries, potassium ion batteries and aluminum ion batteries.

In still another aspect, there is provided a device including the secondary battery and selected from portable electronic instruments, mobile units, electric power supplying instruments and energy storage devices.

The examples and experiments will now be described. The following examples and experiments are for illustrative purposes only and not intended to limit the scope of this disclosure.

EXAMPLES

Preparation Example 1: Preparation of Functionalized Titania Nanoparticles (LTST)

Titania nanoparticles (particle diameter 30-50 nm, 99% purity, Rutile, Inframat, Advanced Materials™) were introduced to water, ultrasonic dispersion was carried out for 30 minutes, 3-trihydroxysilyl-1-propanesulfonic acid (Gelest) was added thereto to pH 2.0, and the resultant mixture was allowed to react at room temperature overnight. To fix lithium, highly concentrated LiOH was added until pH reaches 7.0 and the functionalized nanoparticles were subjected to centrifugal separation 10 times with deionized water in order to remove an excessive amount of 3-(trihydroxysilyl)-1-propanesulfonic acid. During the final washing process, pure ethanol was used and the resultant product was dried in a dry oven at 60° C. overnight.

The functionalized metal oxide nanoparticles obtained from Preparation Example 1 has a structure represented by the following Chemical Formula 2:

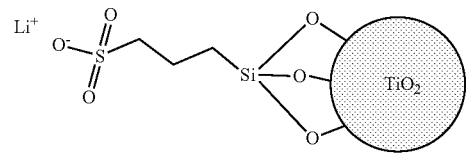

[Chemical Formula 2]

Example 1: Manufacture of Anode (1) Manufacture of Protective Film

The functionalized titania nanoparticles obtained according to Preparation Example 1 were mixed with ethanol to a content of 3 wt % and ultrasonic dispersion was carried out for 30 minutes to prepare a suspension. Commercially available aluminum foil was used as a substrate to form an ultrathin film of the nanoparticles of Preparation Example 1. Particularly, the foil substrate was dipped in water and the suspension was added to the container containing water. Next, when about 30% of the water surface was covered with a self-assembled molecular film, the foil substrate was lifted gradually so that it may be coated with the self-assembled molecular film formed on the water surface, while the suspension was added constantly and continuously so that the self-assembled film may be retained on the water surface. Then, the foil substrate coated with the self-assembled molecular film was positioned on a hot plate maintained at 120° C. for about 1 minute to evaporate remaining solvents. The above coating process was repeated until the coated protective film of nanoparticles has a thickness of 5000 nm.

(2) Transfer of Protective Film

The protective layer of nanoparticles coated on the foil substrate was transferred to the surface of lithium metal thin film (dimension of the lithium metal thin film used for manufacturing an anode—Al foil (7 cm×12 cm 15 μm) & LTST coating on Al foil (7 cm×12 cm 1-5 μm)) by using a rolling mill. Particularly, under a dry condition, a lithium metal thin film, the foil substrate coated with the protective film of nanoparticles and a polycarbonate film were laminated to form a sandwich structure and pressure is applied uniformly thereto in a rolling mill. Herein, the gap in the rolling mill was adjusted to 50% of the total thickness and the roll rotation speed was maintained at 0.5 cm/sec. After rolling, the polycarbonate film was removed and the foil substrate attached to the lithium metal thin film was removed to provide a lithium metal electrode coated with the protective film of functionalized titania nanoparticles.

Comparative Example 1

A lithium metal electrode coated with a protective film was manufactured in the same manner as Example 1, except that non-functionalized titania nanoparticles (particle diameter 30-50 nm, 99% purity, Rutile, Inframat, Advanced Materials™) were used instead of the functionalized titania nanoparticles obtained according to Preparation Example 1.

Comparative Example 2

An electrode was prepared by using a lithium metal thin film not coated with a protective film.

TEST EXAMPLES

Test Method

Before investigating the electrochemical characteristics of a lithium-sulfur battery, constant-current strip/plating of an anode alone was determined and a charge/discharge test was carried out by using a sulfur electrode as a cathode under 0.5 C.

In addition, to determine Coulomb efficiency, modified lithium metal was used as an anode, modified copper was used as a cathode, and the following two types of different electrolytes were used: 1) 1 M LiTFSI 0.2M $LiNO_3$ 0.05 M $CsNO_3$ DME (dimethoxy ethane):DOL (dioxolane)(1:1 v:v), and 2) 1 M LiTFSI 0.2M $LiNO_3$ DME:DOL (1:1 v:v). Celgard 2500 separator and 0.3 mL of electrolyte were used and a coin cell was assembled to carry out a test. During discharging (Li plating on a Cu plate), a constant current of 1 mAh/cm$^2$ was used for 1 hour so that the plating capacity may be 1 mAh/cm$^2$. During charging, a constant current of 1 mAh/cm$^2$ was applied to 2V. While the discharging and charging processes were repeated, Coulomb efficiency for the lithium strip/plating was determined and the charging time was divided by the discharging time to calculate efficiency.

To measure AC impedance, a frequency range of 1 MHz-0.1 Hz was selected and modified lithium metal, Celgard 2500 separator, and 0.3 mL of 1 M LiTFSI 0.2 M $LiNO_3$ 0.05M $CsNO_3$ DME:DOL (1:1 v:v) as electrolyte were used to assemble a symmetric cell, which was determined before electrochemical cycles.

Test Example 1: Wettability and Dispersibility of Electrode Protective Film

To analyze wettability and dispersibility of the electrode protective film according to Example 1 and those of the electrode protective film according to Comparative Example 1, each protective film was dipped into ethanol. The results are shown in FIGS. 5A and 5B.

Figure 5A:
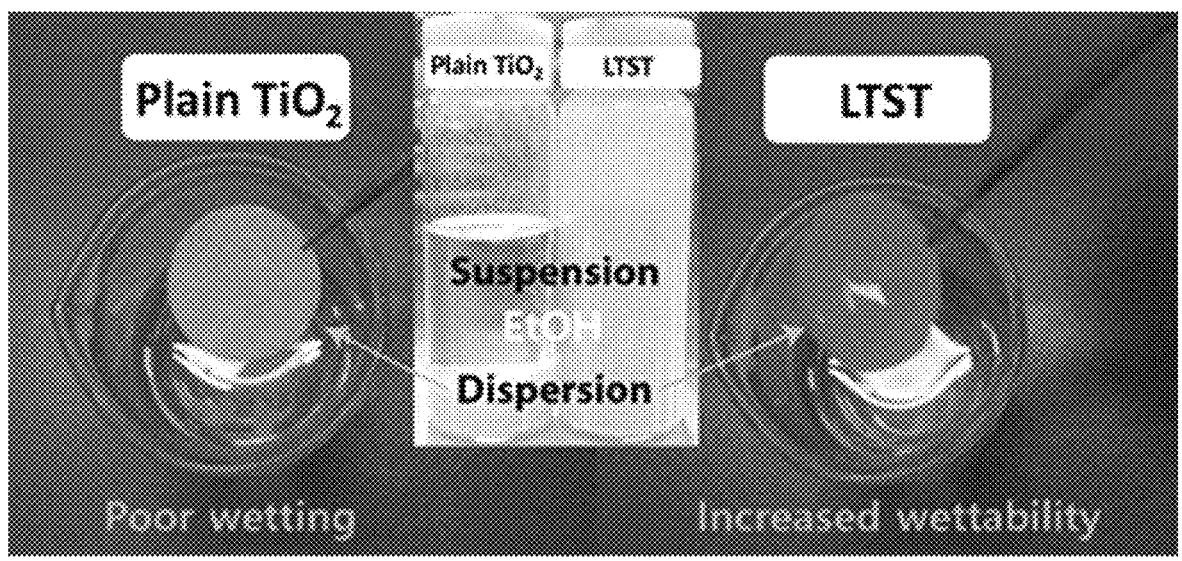
FIGS. 5A and 5B are photographic images illustrating the wettability and dispersibility test results of an electrode protective layer according to Test Example 1.

According to FIG. 5A, the protective film according to Example 1 shows higher dispersibility and wettability as compared to the protective film according to Comparative Example 1. Such excellent dispersibility and wettability increase the active material utilization rate electrochemically.

Figure 5B:
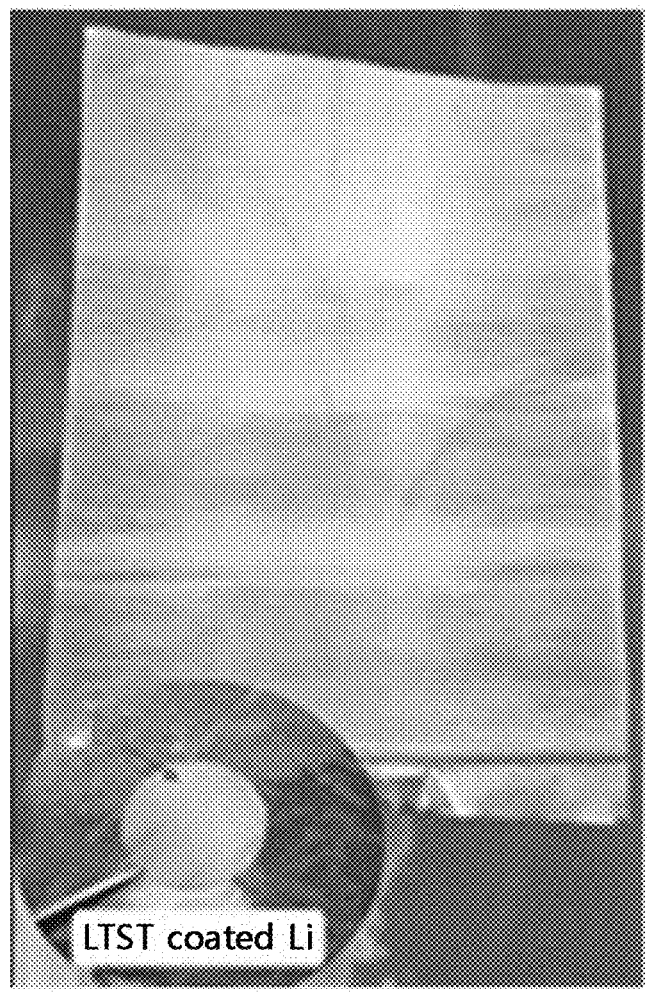

In addition, FIG. 5B illustrates an anode for a lithium-sulfur battery obtained by transferring the protective film for a lithium metal electrode according to Example 1 to the surface of a lithium metal thin film.

Test Example 2: X-Ray Photoelectron Microscopy (XPS) Analysis

Figure 6:
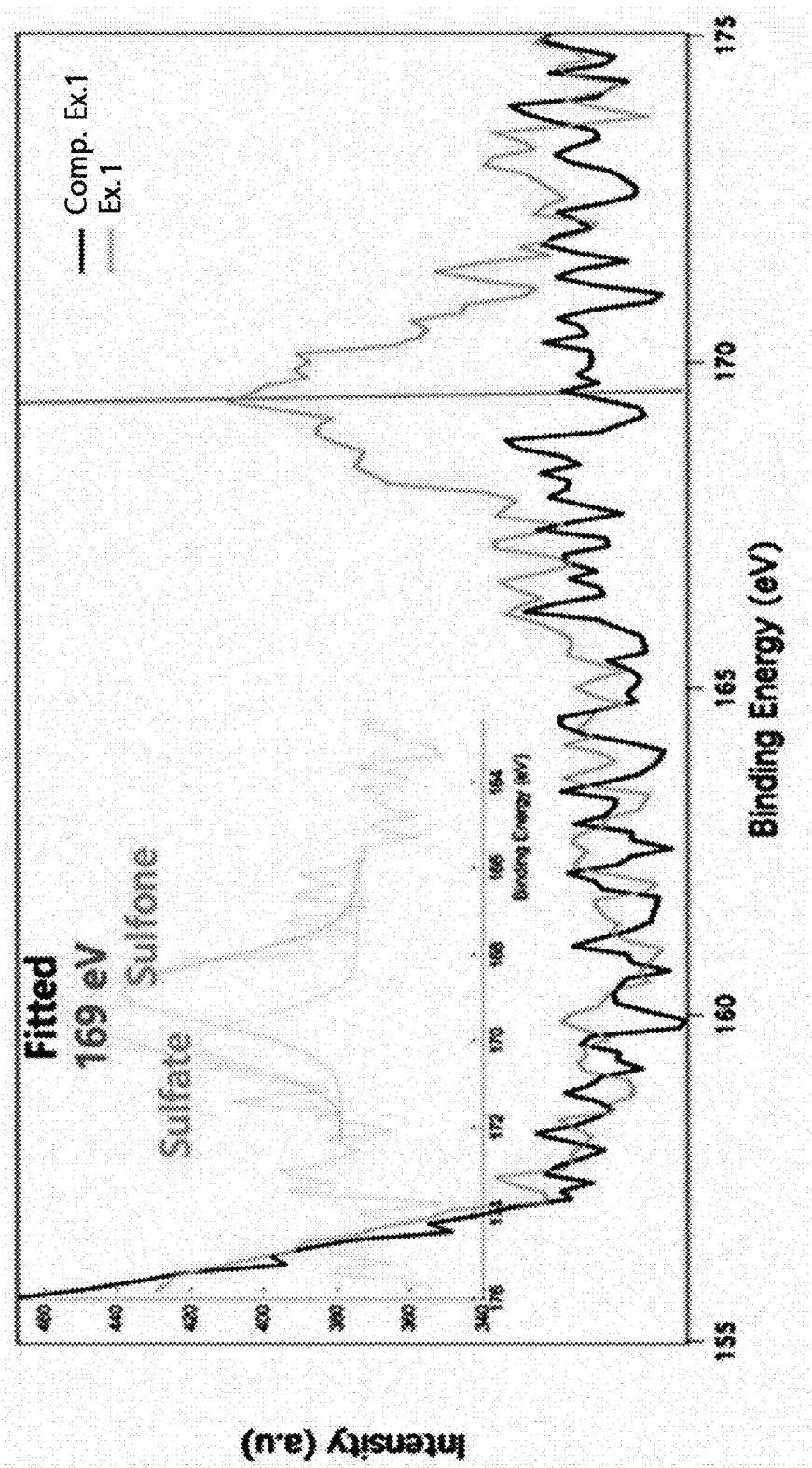
FIG. 6 shows the results of X-ray photoelectron spectroscopy (XPS) according to Test Example 2.

FIG. 6 shows the results of X-ray photoelectron spectroscopy (XPS) for pure titania nanoparticles and the lithium-terminated sulfonated titania nanoparticles according to Preparation Example 1. According to FIG. 6, in the case of the functionalized nanoparticles obtained from Preparation Example 1, it can be seen that sulfur-containing compounds are present through the peak appearing at a binding force of 169 eV.

Test Example 3: Analysis of Impedance

Figure 7:
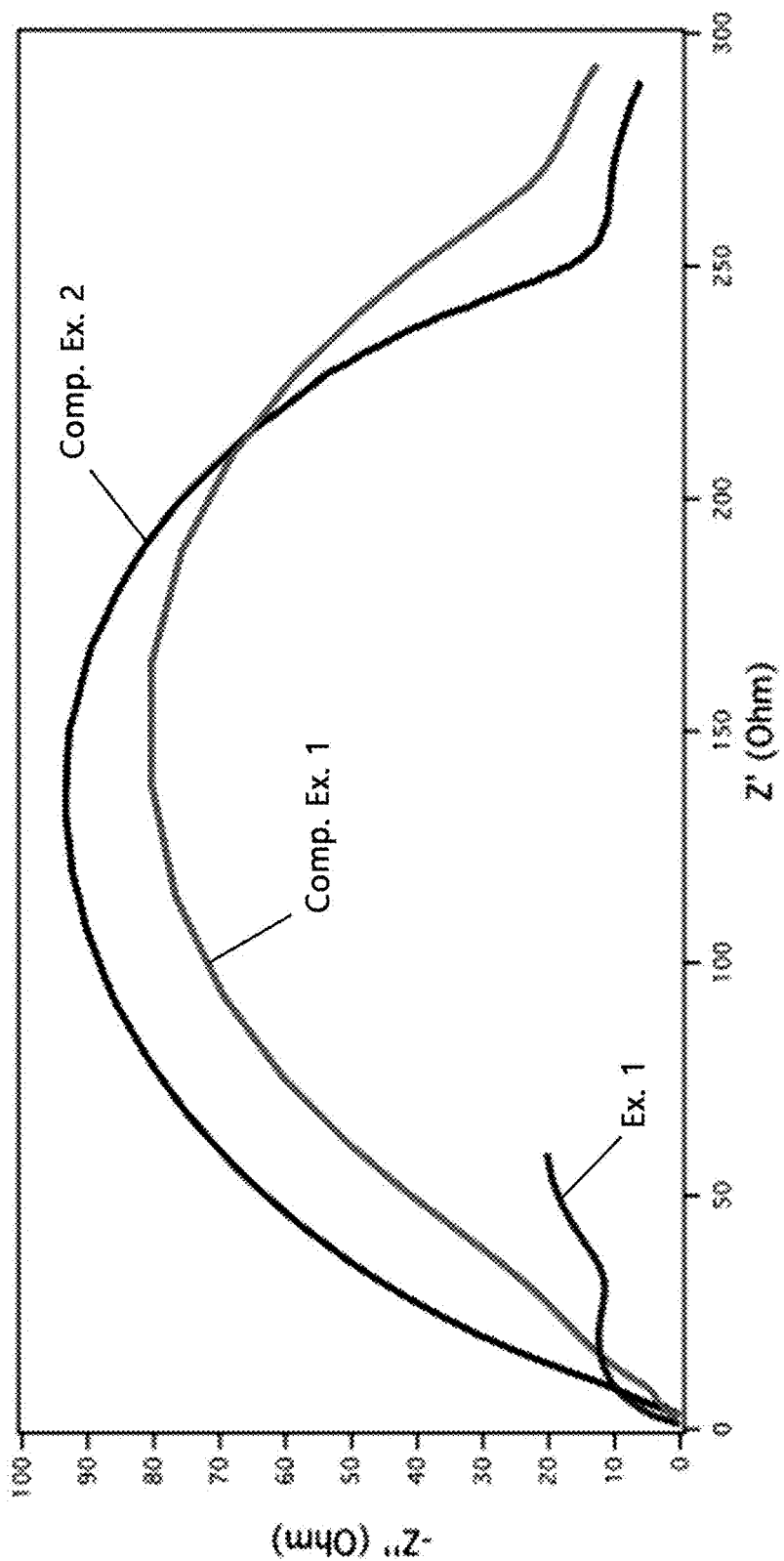
FIG. 7 shows the results of impedance analysis according to Test Example 3.

FIG. 7 shows the results of impedance analysis for the symmetric cells including the anodes according to Example 1, Comparative Example 1 and Comparative Example 2. According to FIG. 7, the cell including the anode of Example 1 shows an impedance reduced to ⅕ or less as compared to the impedance of the symmetric cell including the anode of Comparative Example 1 or Comparative Example 2. This suggests that charge transfer reaction for lithium transfer occurs rapidly.

Figure 8:
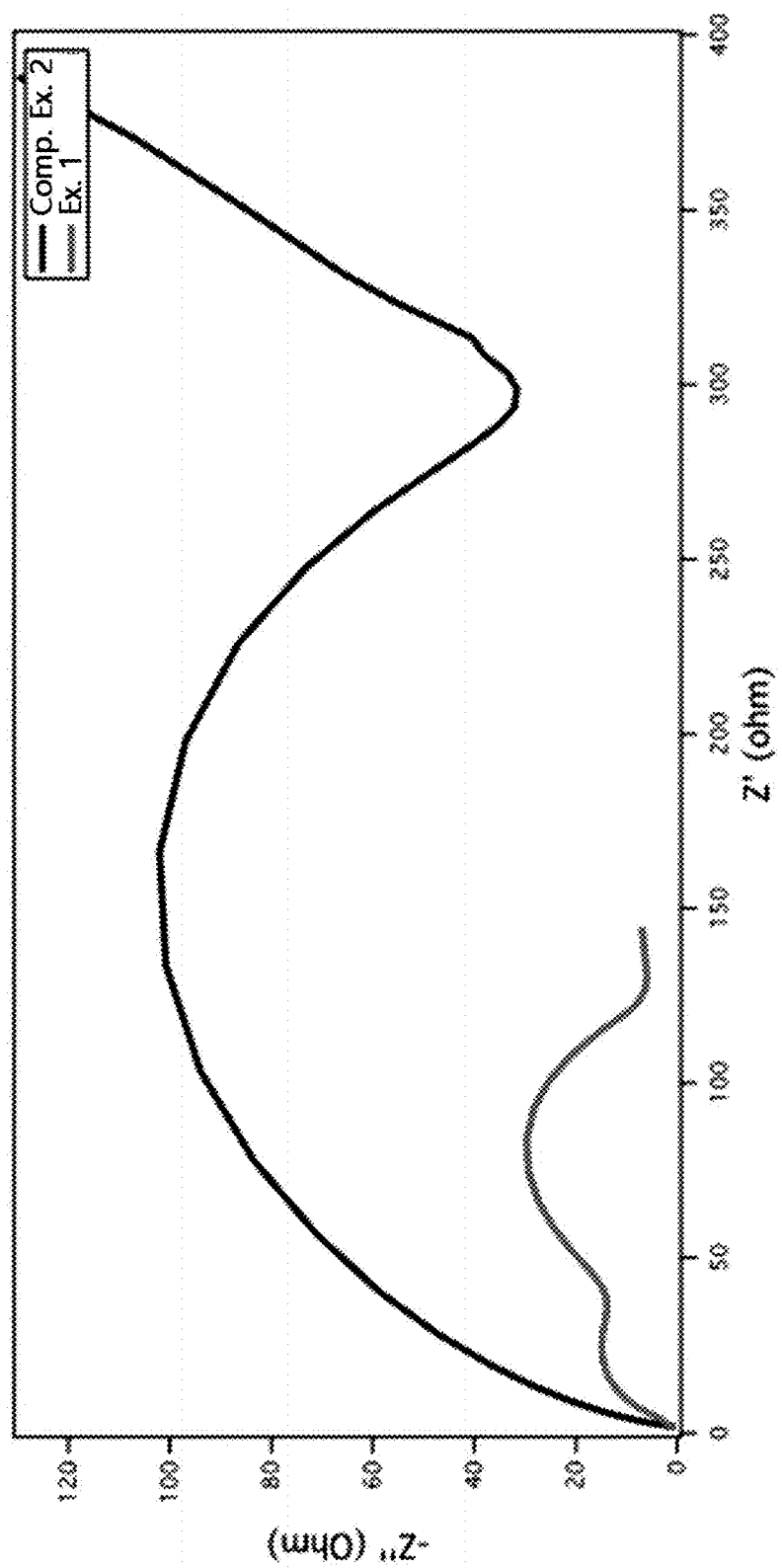
FIG. 8 shows the results of analysis of electrochemical characteristics of the lithium-sulfur battery according to Test Example 4.

Test Example 4: Analysis of Electrochemical Characteristics of Lithium-Sulfur Battery FIG. 8 shows the results of impedance analysis for each of the lithium-sulfur batteries using the anode of Example 1 or the anode of Comparative Example 2 and a sulfur cathode impregnated in multi-walled carbon nanotubes (MWCNT). According to FIG. 8, the cell including the anode of Example 1 shows an impedance reduced to ⅓ or less as compared to the impedance of the lithium-sulfur battery including the anode of Comparative Example 2. This demonstrates that the lithium-sulfur battery including the lithium metal anode having a lithium-terminated sulfonated titania coating layer has significantly improved characteristics as compared to the conventional lithium-sulfur battery.

Test Example 5: Test for Cell Voltage Stability

Figure 9:
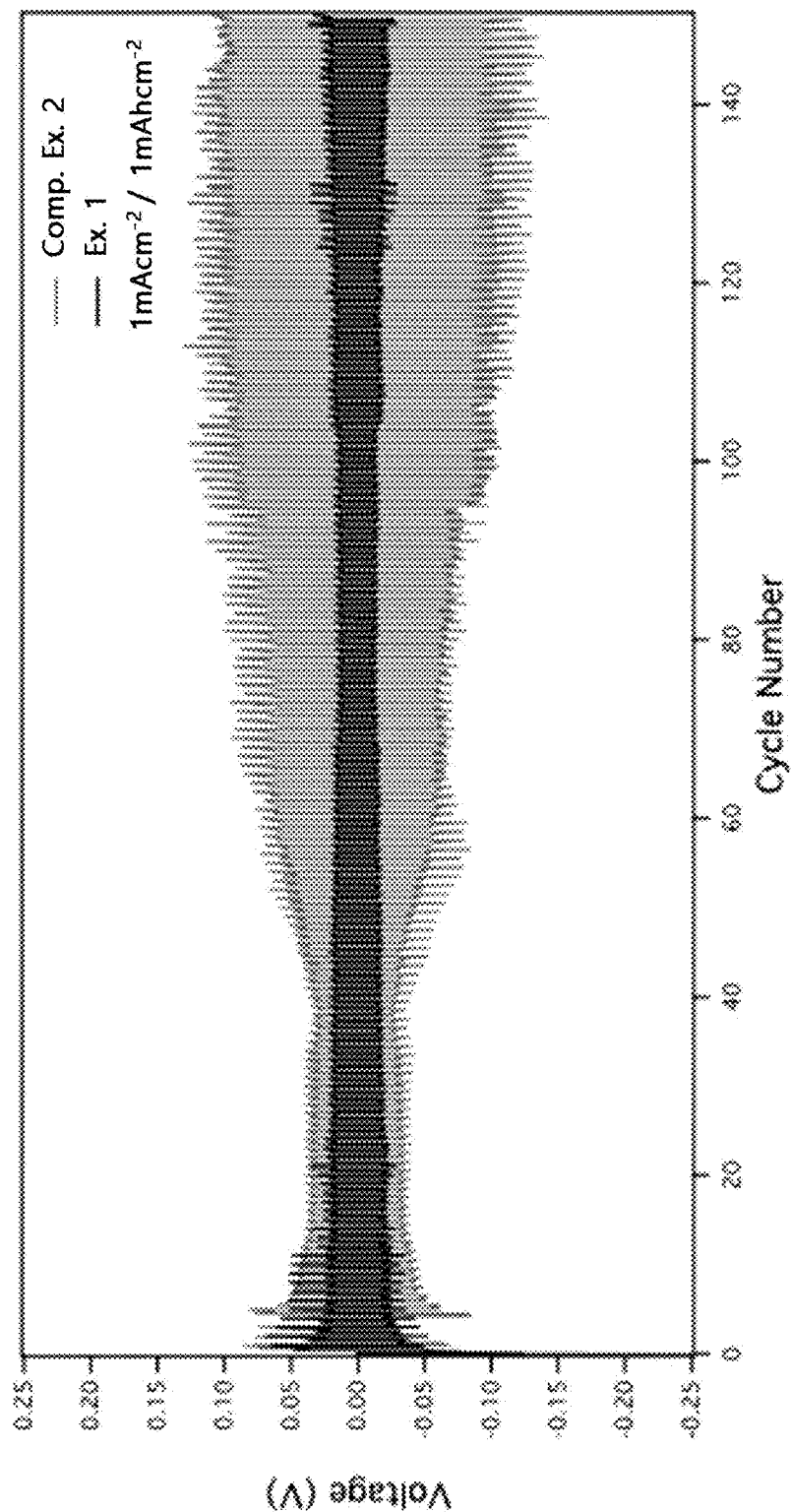
FIG. 9 shows the results of the test for cell voltage stability according to Test Example 5.

FIG. 9 shows the results of a strip/plating test for the symmetric cell including the anode of Example 1 and the symmetric cell including the anode of Comparative Example 2. According to FIG. 9, the symmetric cell including the anode of Example 1 shows significantly increased voltage stability as compared to the symmetric cell including the anode of Comparative Example 2. In the case of the anode of Comparative Example 2, a voltage increase appears after about the 40$^{th}$ cycle and the voltage becomes unstable. On the contrary, the anode of Example 1 shows significantly stable voltage peaks even after the 150$^{th}$ cycle.

Test Example 6: Analysis of Cycle Life Characteristics and Coulomb Efficiency

Figure 10:
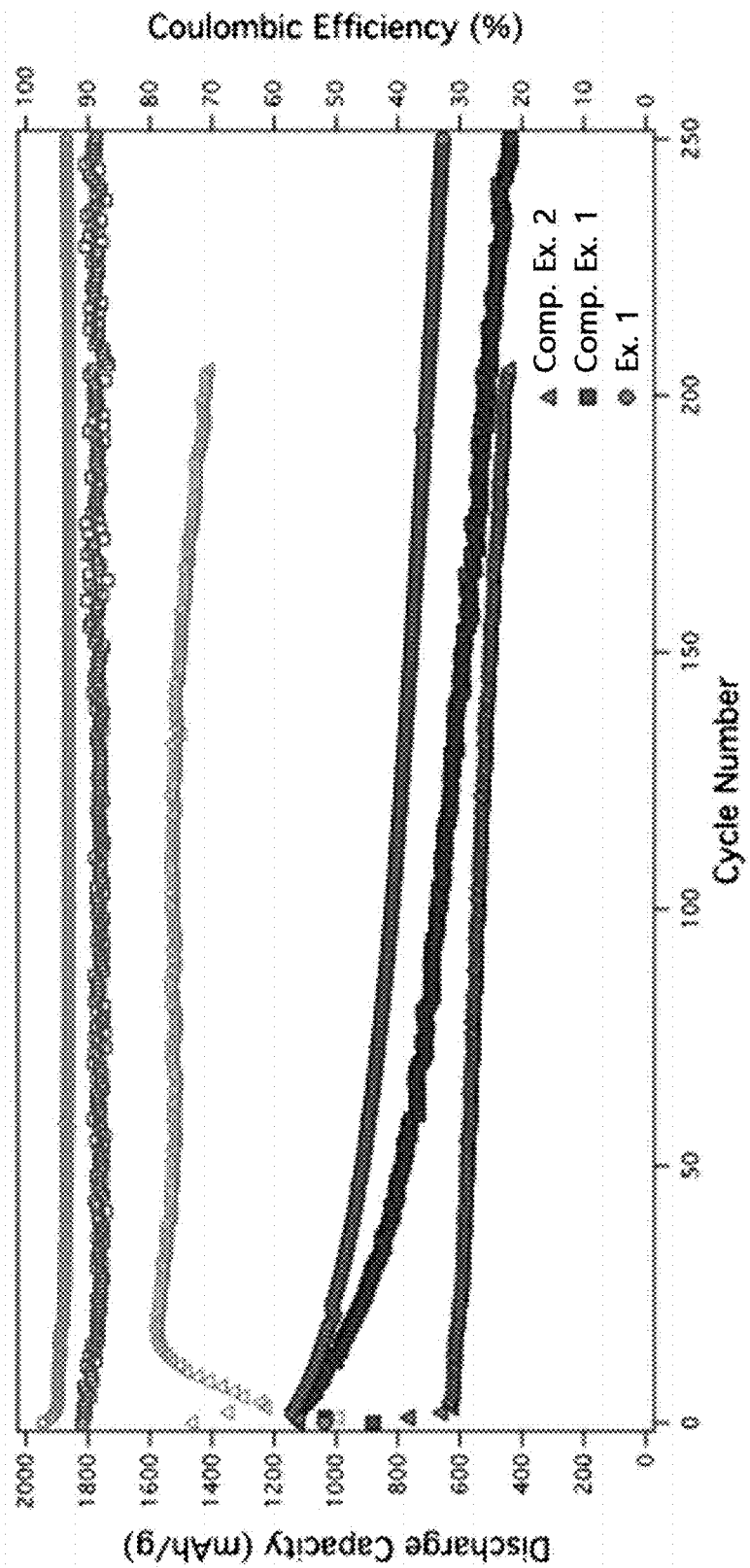
FIG. 10 shows the results of analysis of cycle life characteristics and Coulomb efficiency according to Test Example 6.

FIG. 10 shows the results of analysis for cycle life characteristics and Coulomb efficiency of the lithium-sulfur batteries using the anodes according to Example 1, Comparative Example 1 and Comparative Example 2 and a sulfur cathode impregnated in multi-walled carbon nanotubes (MWCNT), obtained under a 0.5 C constant-current charging/discharging condition. According to FIG. 10, at the 200$^{th}$ cycle, the lithium-sulfur battery including the anode of Comparative Example 2 shows a residual capacity of about 450 mAh/g, while the lithium-sulfur battery including the anode of Comparative Example 1 and the lithium-sulfur battery including the anode of Example 1 show a residual capacity of about 520 mAh/g and about 720 mAh/g, respectively. Therefore, the cell including the anode according to Example 1 shows the highest cycle life characteristics and provides a Coulomb efficiency of 93% or more.

Test Example 7: Analysis of Charge/Discharge Characteristics

Figure 11:
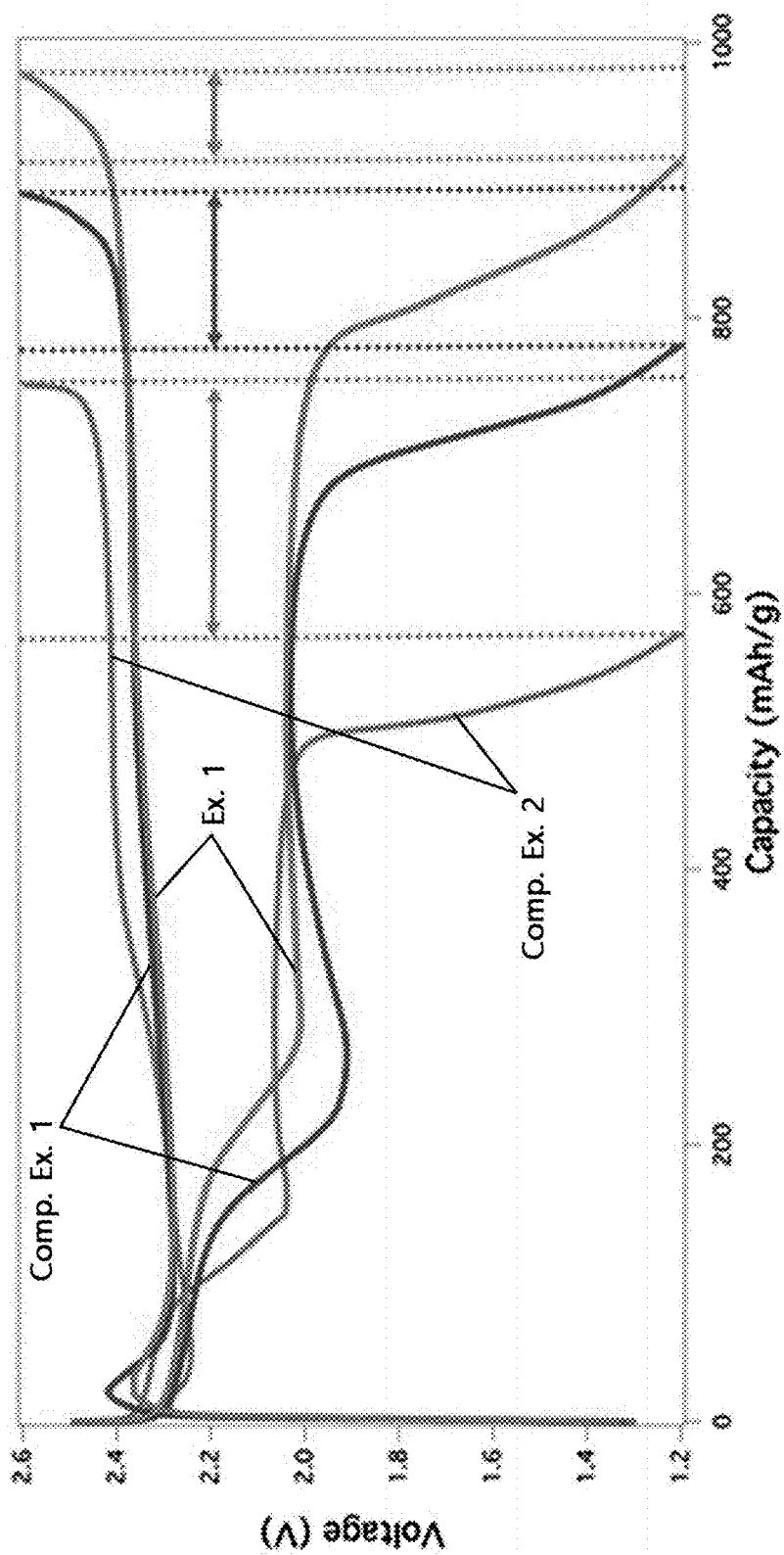
FIG. 11 shows the results of analysis of charge/discharge characteristics according to Test Example 7.

FIG. 11 is a graph illustrating the charge/discharge curve of each of the lithium-sulfur batteries using the anodes according to Example 1, Comparative Example 1 and Comparative Example 2 and a sulfur cathode impregnated in multi-walled carbon nanotubes (MWCNT), obtained at the 50$^{th}$ cycle under a charging/discharging condition of 0.5 C. According to FIG. 11, the lithium-sulfur battery including the anode of Example 1 shows the lowest degree of overcharging by which charge capacity is larger than discharge capacity.

While the present disclosure has been described with respect to the specific embodiments, it will be apparent to those skilled in the art that various changes and modifications may be made without departing from the spirit and scope of the disclosure as defined in the following claims.

20. The method according to claim 2, wherein the functionalized metal oxide nanoparticles are comprised of a functionalized metal oxide represented by Chemical Formula 2 below:
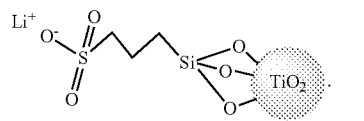

What is claimed is:

1. An anode, comprising:
a thin film of an anode material; and
a protective layer that is formed on the thin film of the anode material, that comprises functionalized metal oxide nanoparticles, which are lithium-terminated sulfonated metal oxide nanoparticles, and that has a thickness of 300-5000 nm.

2. A method for manufacturing an anode, comprising the steps of:
dispersing functionalized metal oxide nanoparticles, which are lithium-terminated sulfonated metal oxide nanoparticles, into a dispersion medium to form a dispersion;
dipping a substrate into water, and introducing the dispersion thereto so that the functionalized metal oxide nanoparticles form a self-assembled molecular film on the water surface;
lifting the substrate over the water surface to transfer the self-assembled molecular film onto the substrate, thereby providing a substrate coated with a functionalized metal oxide film; and
transferring the functionalized metal oxide film onto a thin film of an anode material to provide an anode coated with the functionalized metal oxide film.

3. The method according to claim 2, wherein the dispersion comprises the functionalized metal oxide nanoparticles in an amount of 1-5 wt %.

4. The method according to claim 2, wherein the self-assembled molecular film in the dipping step is formed to cover 20-40% of the surface area of the water surface.

5. The method according to claim 2, wherein the dipping and lifting steps are repeated to control thickness of the self-assembled molecular film.

6. The method according to claim 2, wherein transferring in step (4) is carried out by laminating the substrate coated with the functionalized metal oxide film with the thin film of the anode material and carrying out pressurization through rolling.

7. A secondary battery comprising the anode as defined in claim 1.

8. The secondary battery according to claim 7, which is a battery selected from the group consisting of a lithium-sulfur battery, a lithium-air battery, a lithium ion battery, a magnesium ion battery, a sodium ion battery, a potassium ion battery, and an aluminum ion battery.

9. A device comprising the secondary battery as defined in claim 7 and being selected from the group consisting of portable electronic instruments, mobile units, electric power supplying instruments, and energy storage devices.

10. The anode according to claim 1, wherein the thin film of the anode material comprises a metal selected from the group consisting of lithium, magnesium, sodium, potassium and aluminum.

11. The anode according to claim 1, wherein the functionalized metal oxide nanoparticles are comprised of a functionalized metal oxide represented by Chemical Formula 1 below:

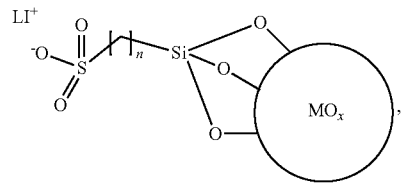

where $MO_x$ is a metal oxide, and n is a repetition number and is an integer selected from 1 to 10.

12. The anode according to claim 11, wherein the metal oxide includes at least one metal oxide selected from the group consisting of titania, alumina, silica, zirconia, seria, yttria and manganese oxide.

13. The anode according to claim 1, wherein the functionalized metal oxide nanoparticles are comprised of a functionalized metal oxide represented by Chemical Formula 2 below:

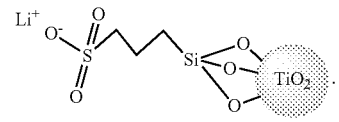

14. The method according to claim 2, wherein the step of dispersing includes:
dispersing metal oxide nanoparticles into a solvent to provide a dispersion; and
mixing the dispersion with a sulfonating agent and carrying out a reaction to obtain a mixture containing sulfonated metal oxide nanoparticles; and
adding lithium hydroxide to the mixture to form lithium terminal groups and provide the functionalized metal oxide nanoparticles.

15. The method according to claim 14, further comprising, after the step of adding lithium hydroxide, removing the sulfonating agent remaining by centrifugal separation.

16. The method according to claim 14, wherein the sulfonating agent is 3-trihydroxysilyl-1-propanesulfonic acid.

17. The method according to claim 14, wherein the metal oxide nanoparticles have a particle diameter of 30-50 nm.

18. The method according to claim 2, wherein the functionalized metal oxide nanoparticles are comprised of a functionalized metal oxide represented by Chemical Formula 1 below:

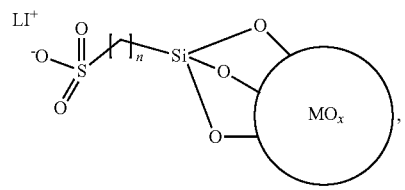

where $MO_x$ is a metal oxide, and n is a repetition number and is an integer selected from 1 to 10.

19. The method according to claim 18, wherein the functionalized metal oxide includes at least one metal oxide selected from the group consisting of titania, alumina, silica, zirconia, seria, yttria and manganese oxide.